(12) United States Patent
Chen (10) Patent No.: US 9,893,639 B1
(45) Date of Patent: Feb. 13, 2018

(54) SYNCHRONOUS RECTIFIER CONTROL CIRCUIT AND METHOD USING VOLT-SECOND BALANCING

(71) Applicant: GEM-MICRO SEMICONDUCTOR INC., Taoyuan (TW)

(72) Inventor: Cheng-Yu Chen, Taipei (TW)

(73) Assignee: Gem-Micro Semiconductor Inc., Taoyuan (TW)

( * ) Notice: Subject to any disclaimer, the term of this patent is extended or adjusted under 35 U.S.C. 154(b) by 0 days.

(21) Appl. No.: 15/480,928

(22) Filed: Apr. 6, 2017

(51) Int. Cl.
*H02M 7/217* (2006.01)
*H02M 3/335* (2006.01)
*H02M 1/08* (2006.01)

(52) U.S. Cl.
CPC ....... *H02M 3/33592* (2013.01); *H02M 1/083* (2013.01)

(58) Field of Classification Search
CPC ..... H02M 2001/0012; H02M 3/33515; H02M 7/217
USPC .............................. 363/21.06, 21.14, 89, 127
See application file for complete search history.

(56) References Cited

U.S. PATENT DOCUMENTS

| | | |
|---|---|---|
| 8,526,202 B2 | 9/2013 | Fang et al. |
| 2016/0294298 A1* | 10/2016 | Wong ................ H02M 3/33592 |
| 2017/0085188 A1* | 3/2017 | Foresta ............. H02M 3/33546 |

* cited by examiner

*Primary Examiner* — Jeffrey Sterrett
(74) *Attorney, Agent, or Firm* — Muncy, Geissler, Olds & Lowe, P.C.

(57) ABSTRACT

A synchronous rectifier control circuit and the control method thereof for controlling a switching power supply which includes a transformer, a first switch transistor and a second switch transistor. According to one embodiment to the present invention, the control circuit comprises a conducting detection module, a voltage averaging module, a voltage-second balance module and a logic-controlled module. The conducting detection module is comprised of a first reference potential and a conduction signal. The voltage averaging module includes an averaged circuit and outputs a second reference potential. The voltage-second balance module includes a first reference current, a second reference current, a voltage-second balance switch, a voltage-second balance comparator and a timing capacitor, and outputs a reset signal. The logic-controlled module includes a logic circuit to control the second switch transistor to turn on or off.

7 Claims, 5 Drawing Sheets

SYNCHRONOUS RECTIFIER CONTROL CIRCUIT AND METHOD USING VOLT-SECOND BALANCING

FIELD OF THE INVENTION

The present invention is related to a synchronous rectifier control circuit and the control method thereof. In particular, it relates to a synchronous rectifier control circuit and the control method thereof which applies the voltage-second balance principle to detect the cut-off time of the switch transistors.

BACKGROUND OF THE INVENTION

Figure 1:
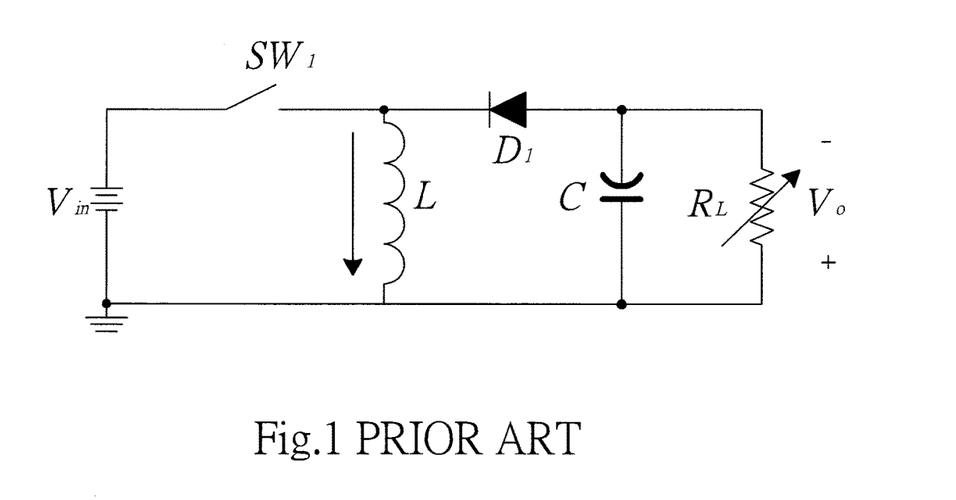
FIG. 1 illustrates the circuit of a conventional buck-boost voltage regulator.
Figure 2:
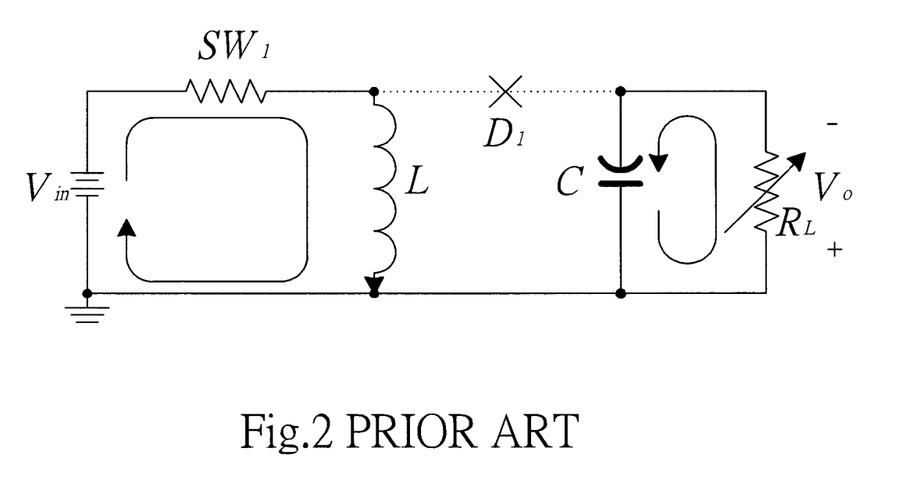
FIG. 2 is a schematic diagram showing the switch transistor of the conventional buck-boost voltage regulator as shown in FIG. 1 is in an on-state.
Figure 3:
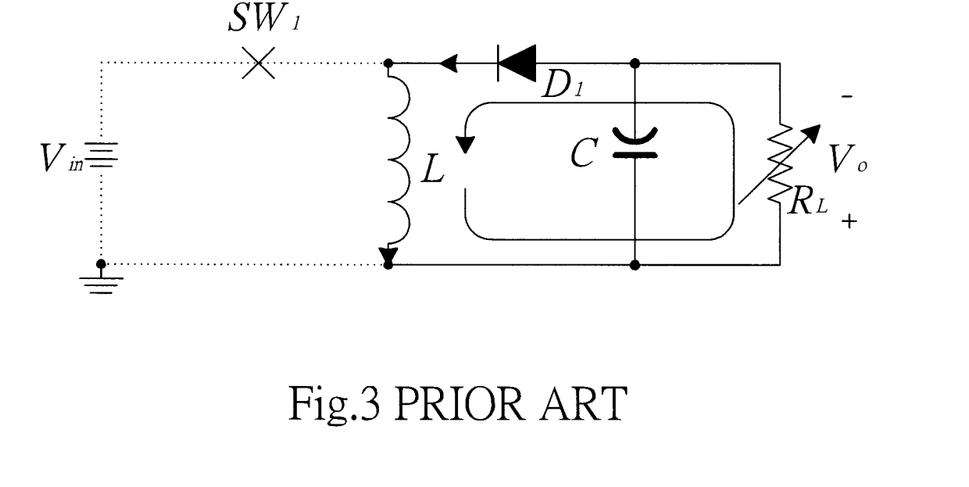
FIG. 3 is a schematic diagram showing the switch transistor of the conventional buck-boost voltage regulator as shown in FIG. 1 is in an off-state.

Referring to FIG. 1, it illustrates the basic circuit of a conventional bust-boost voltage regulator. In reference to FIG. 2, when the switch transistor SW1 is in a conducting state (on-state), the energy provided by the input power supply Vin is stored into the inductor L, and, at the same time, the diode D1 is off. Now turning to FIG. 3, when the switch transistor SW1 is switched off, the energy stored in the inductor L produces an electromotive force in a direction reverse to the input power supply Vin to charge the capacitor C, thereby forcing the diode D1 in a conducting state. Accordingly, the direct current (DC) input power supply Vin is temporarily converted to an alternating current (AC) power and dropped to output a voltage Vo, further providing the power required by a load RL.

When the diode D1 in the above-identified rectifier circuit is conducting, the diode D1 generates a barrier voltage which consumes and wastes some power on the diode D1 itself. The power waste is particularly noticeable at a low output voltage, for example at the output voltage Vo of 1.5V. Under this condition, even with the use of Schottky diodes, it will still generate a barrier voltage of 0.4V±0.1V, resulting in a poor conversion efficiency.

In order to solve the drawback of such a non-synchronous rectifier circuit, the US patent U.S. Pat. No. 8,526,202, for example, provides a synchronous rectifier circuit in which the diode D1 is replaced by another switch transistor. The switch transistor can be a Metal-Oxide-Semiconductor Field-Effect Transistor (MOSFET) and so forth. It is well-known that, when a field-effect transistor is conducting, it produces a linear region (a linear voltage-current relationship), and the on-resistance is about 50 mΩ. Assume that the conducting current is 2 A, the resulting voltage drop is merely 0.1V. It thereby improves the disadvantages of the conversion loss due to a high barrier voltage of the diode D1 in the conventional circuit. Such a circuit, in which the gate voltage of the switch transistor needs to be maintained in a phase synchronization with the rectified voltage, is thus named "synchronous rectifier circuit". The two switch transistors in the mentioned synchronous rectifier circuit must take turns to be conducted or cut off alternatively at each time point. If the two switch transistors are both in a conducting state at the same time, it may cause the damage of the switching power supply.

The above-identified patent utilizes the voltage difference at the two ends of the switch transistor to control conducting or cut-off states. It is equipped with a comparator with an offset voltage at one end to constitute a structure similar to a zero current detector circuit. Through this approach, the purpose of synchronous rectification can be obtained. However, when the circuit is continuously operated in a conduction mode, the switch transistor at the secondary side will be burned and damaged. Therefore, how to accurately control the switching timing and to enable the circuit to operate in a continuous conduction mode, in fact, is the design subject to achieve for a synchronous rectifier circuit.

SUMMARY OF THE INVENTION

Accordingly, the present invention is directed to solve the above-stated problem that the conventional circuits cannot be operated in a continuous conduction mode.

In order to achieve this goal, the present invention provides a synchronous rectifier control circuit for controlling a switching power supply. The switching power supply includes a transformer, a first switch transistor coupled to the primary side of the transformer, and a second switch transistor coupled between the secondary side of the transformer and a load. According to one embodiment to the present invention, the synchronous rectifier control circuit comprises a conducting detection module, a voltage averaging module, a voltage-second balance module and a logic-controlled module. The conducting detection module comprises a first reference potential and a conducting detection comparator. The conducting detection comparator outputs a conduction signal which is configured as the first reference potential or the ground potential according to whether the potential difference between the drain and the source of the second switch transistor is at a high potential. The voltage averaging module comprises an averaged circuit coupled to the conduction signal, and a second reference potential outputted from the averaged circuit. The voltage-second balance module comprises a first reference current corresponding to the first reference potential, a second reference current corresponding to the second reference potential, a voltage-second balance switch coupled between the first reference current and the second reference current and controlled by the conduction signal to switch on or off, a voltage-second balance comparator, and a timing capacitor. The voltage-second balance comparator comprises a positive input terminal at a low potential and a negative input terminal coupled to the end of the voltage-second balance switch in connection to the second reference current, and a reset signal coupled to the output of the voltage-second balance comparator. The timing capacitor is connected between the positive input terminal and the negative input terminal. The logic-controlled module comprises a logic circuit coupled to the conduction signal and the reset signal. The output of the logic circuit is connected to the gate of the second switch transistor so as to control the second switch transistor to turn on or off.

Further, the conducting detection module of the present invention comprises a first threshold potential. And the conduction signal is configured as the first reference potential or the ground potential according to whether the potential difference between the drain and the source of the second switch transistor is higher than the first threshold potential.

Further, the voltage-second balance module of the present invention comprises a second threshold potential coupled to the positive input terminal, in which the reset signal is configured as pulse waves or the ground potential according to whether the potential of the negative input terminal is lower than the second threshold potential.

Further, the averaged circuit of the present invention comprises at least one averaged resistor coupled to the conduction signal and at least one averaged capacitor connected between the averaged resistor and the ground potential.

Further, the voltage-second balance module of the present invention comprises a pulse generator coupled to the conduction signal, and a reset switch connected in parallel to the timing capacitor; in which the pulse generator generates pulse waves when the conduction signal changes from a low potential to a high potential and turns on the reset switch.

The present invention is also directed to provide a synchronous rectification control method for controlling a switching power supply. The switching power supply is comprised of a transformer, a first switch transistor coupled to the primary side of the transformer and switched between on and off intermittently, and a second switch transistor coupled between the secondary side of the transformer and a load. The synchronous rectification control method comprises the steps as follows: (a) set up the time at which the first switch transistor is turned on as an on-time, and the time at which it is turned off as a cut-off time; (b) generate a conduction signal which is configured to output a first reference potential within the on-time and a ground potential within the cut-off time, and generate a second reference potential equal to the mean value of the conduction signal; (c) convert the first reference potential to a first reference current, and convert the second reference potential to a second reference current; (d) provide a timing capacitor in which a timing current flows through, thus generating an integrating voltage; (e) set up, within the on-time, the timing current configured to be the first reference current subtracting the second reference current, and, within the cut-off time, set up the timing current configured to be the negative value of the second reference current; and (f) determine whether the integrating voltage changes from a high potential to zero and perform the sub-steps as follows: (f1) if the integrating voltage is from a high potential to zero, then turn off the second switch transistor.

Further, step (f) comprises a sub-step: (f2) clear out the voltage of the timing capacitor.

As a result, the present invention has the advantages over the prior art as below:

1. The present invention utilizes the voltages across the drain, the source and the gate of the second switch transistor to calculate the conducting time of the secondary side of the transformer, thereby improving the shortcomings of the prior art which applies only the zero-current detection method and can only be operated in a discontinuous conduction mode.
2. The voltage-second balance module of the present invention adopts the combination of capacitance and current to calculate the accurate switching timing of the second switch transistor to be turned on or off. It replaces the conventional method, in which the circuit is equipped with coils in the transformer in order to calculate the conduction time. The present invention thus reduces the size of the circuit, resulting in a more compact design.

BRIEF DESCRIPTION OF THE DRAWINGS

The drawings described herein are for illustration purposes only and are not intended to limit the scope of the present disclosure in any way.

FIG. 6 is a timing diagram illustrating the implementation mode of the present invention.

FIG. 7 is a timing diagram showing the conventional voltage regulator operated in a continuous conducting state.

FIG. 8 is a circuit diagram of a voltage-second balance module according to the present invention.

FIG. 9 is a timing diagram of the voltage-second balance module of the present invention.

FIG. 10 is a flow chart of a control method according to the present invention.

DETAILED DESCRIPTION OF THE PREFERRED EMBODIMENTS

Detailed descriptions and technical contents according to embodiments to the present invention will be described with reference to the accompanying drawings shown below. In addition, the drawings are not necessarily prepared in an actual proportion. It is apparent that the proportions of the drawings are not intended to limit the scope of the present invention as claimed.

[Descriptions of the Circuit Structures]

Figure 4:
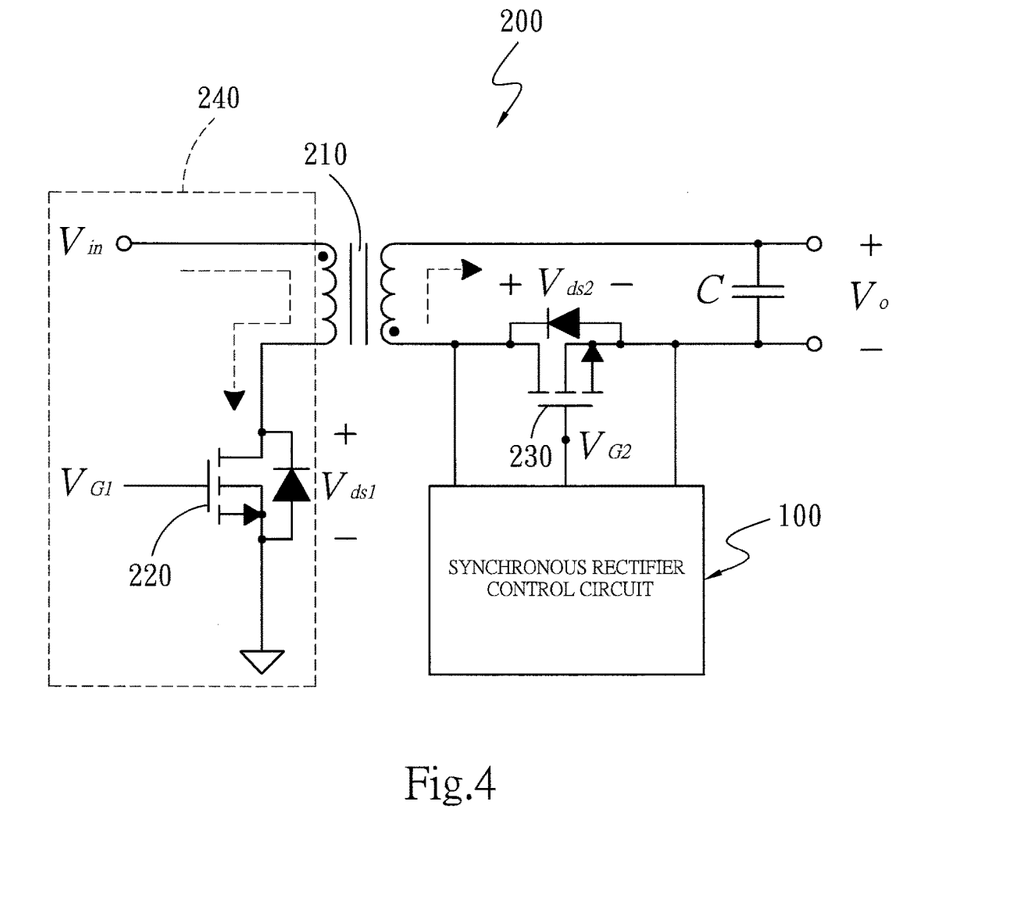
FIG. 4 is a schematic diagram of a synchronous rectifier control circuit according to the present invention as used in combination with a switching power supply.

Regarding the techniques of the present invention, please refer to FIG. 4. The present invention provides a synchronous rectifier control circuit applied to control a switching power supply 200. The switching power supply 200 includes a transformer 210, a primary circuit 240 coupled to the primary side of the transformer 210, a second switch transistor 230 coupled between the secondary side of the transformer 210 and a load, and an output capacitor connected in parallel to the load. In one embodiment, the primary circuit 240 is comprised of a first switch transistor 220 coupled between the primary side of the transformer 210 and the ground potential, and a first gate control signal VG1 connected to the gate of the first switch transistor 220. The first gate control signal VG1 is used to control the first switch transistor 220 to turn on or off Since the methods of generating the first gate control signal VG1 have been described and well-known by those of ordinary skills in the art to which the present invention pertains, they will not be described in detail herein.

Figure 5:
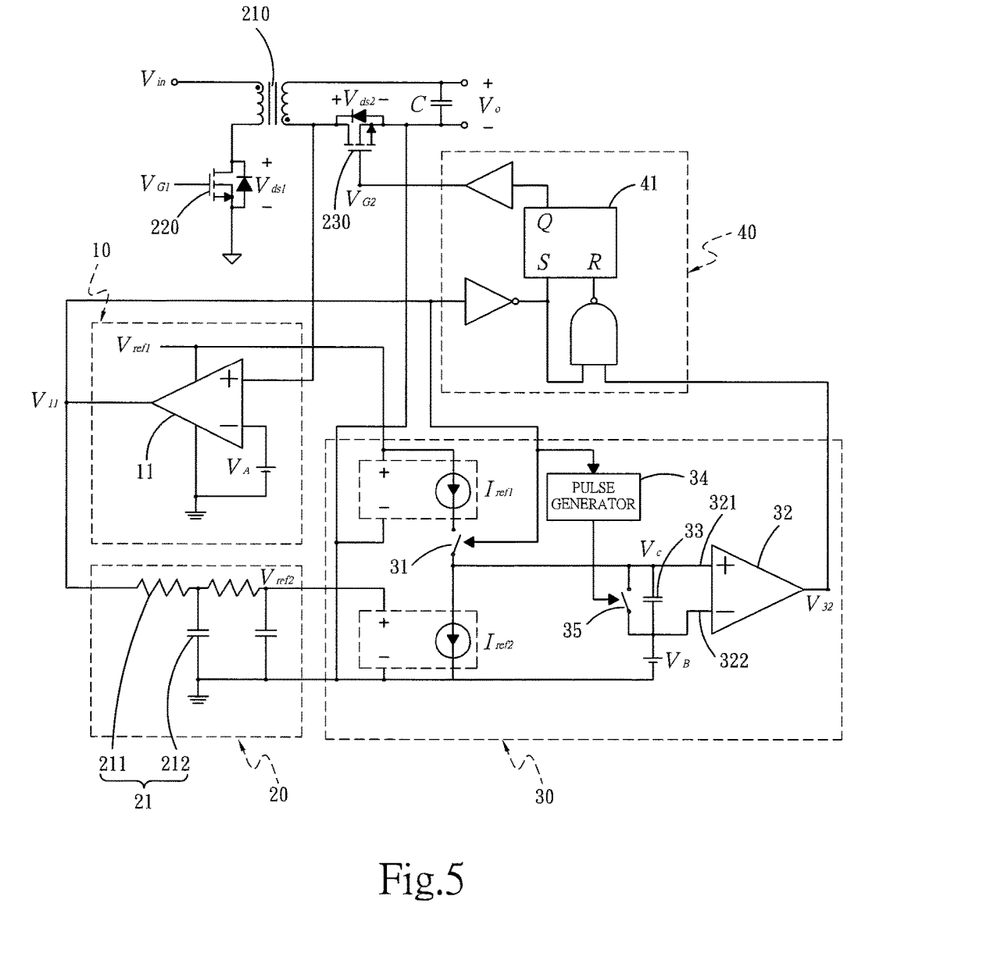
FIG. 5 is a circuit diagram of the synchronous rectifier control circuit according to one embodiment to the present invention.

Referring to FIGS. 5 and 6, more specifically, the synchronous rectifier control circuit is primarily comprised of a conducting detection module 10, a voltage averaging module 20, a voltage-second balance module 30 and a logic-controlled module 40. The conducting detection module 10, for detecting a conducting state of the first switch transistor 220, includes a first reference potential Vref1 and a conducting detection comparator 11. The conducting detection comparator 11 outputs a conduction signal V11 which is configured as the first reference potential Vref1 or the ground potential according to whether the potential difference between the drain and the source of the second switch transistor 230 is at a high potential. When the circuit is in a steady-state and the first switch transistor 220 is on, its drain-to-source voltage Vds1 is at a low potential. Meanwhile, the second switch transistor 230 is turned off, so its drain-to-source voltage Vds2 is at a high potential instead, at which point, the conduction signal V11 presents the first reference potential Vref1. On the other hand, the first switch transistor 220 is turned off while the second switch transistor 230 is on, so the drain-to-source voltage Vds2 is at a low potential. In the preferred embodiment, a first threshold potential VA is connected at the negative input side of the conducting detection comparator 11. Consequently, the conduction signal V11 is configured as the first reference potential Vref1 or the ground potential according to whether the drain-to-source potential difference of the second switch transistor 230 is higher than the first threshold potential VA, thereby canceling the offset voltage of the circuit.

The voltage averaging module 20 is comprised of an averaged circuit 21 coupled to the conduction signal V11, and a second reference potential Vref2 outputted from the averaged circuit 21. In one preferred embodiment, the averaged circuit 21 is a resistor-capacitor series-parallel circuit whose function is to convert the time-varying conduction signal V11 to a mean voltage (namely the second reference potential Vref2). In the present invention, the averaged circuit 21 is merely to achieve the purpose of converting the conduction signal V11 to the mean voltage and therefore the specific designs of the averaged circuit 21 are not limited herein.

The voltage-second balance module 30 is comprised of a first reference current Iref1 corresponding to the first reference potential Vref1, a second reference current Iref2 corresponding to the second reference potential Vref2 (can be realized by a conventional circuit such as a voltage-current converter and so forth), a voltage-second balance switch 31 (can be a transistor element) connected between the first reference current Iref1 and the second reference current Iref2 and controlled by the conduction signal V11 to turn on or off, a voltage-second balance comparator 32 and a timing capacitor 33. The voltage-second balance comparator 32 includes a positive input terminal 321 at a low potential, a negative input terminal 322 coupled to the end of the voltage-second balance switch 31 in connection to the second reference current Iref2, and a reset signal V32 connected at the output terminal of the voltage-second balance comparator 32. The timing capacitor 33 is connected between the positive input terminal 321 and the negative input terminal 322, and thereby an integrating voltage VC is generated at the two ends of the timing capacitor 33 by the current. In one preferred embodiment, the voltage-second balance module 30 further includes a pulse generator 34 coupled to the conduction signal V11, and a reset switch 35 connected in parallel to the timing capacitor 33. The pulse generator 34 generates pulse waves when the conduction signal V11 changes from a low potential to a high potential, thereby turning on the reset switch 35. Since one end of the timing capacitor 33 is connected to the ground potential, the charges of the timing capacitor 33 are moving toward the ground potential at the moment when the reset switch 35 is turned on, thereby ensuring to completely clear the integrating voltage VC at each instant moment whenever the first switch transistor 220 is turned on. In addition, the voltage-second balance module 30 includes a second threshold potential VB coupled to the positive input terminal 321. The reset signal V32 is configured as pulse waves or the ground potential according to whether the potential of the negative input terminal 322 is lower than the second threshold potential VB, thereby canceling the offset voltage in the circuit.

The logic-controlled module 40 comprises a logic circuit 41 connected to the conduction signal V11 and the reset signal V32. The output end of the logic circuit 41 is connected to the gate of the second switch transistor 230 and the logic circuit 41 outputs a second gate control signal VG2 to control the second switch transistor 230 to turn on or off.

In one preferred embodiment, the logic circuit 41 is comprised of a logic gate and a reset-set (RS) flip-flop, and the output of the RS flip-flop has a reverse direction from the conduction signal V11, thereby controlling the second switch transistor 230 and the first switch transistor 220 can take turn to be conducted alternatively to achieve the purpose of the switching synchronous rectification.

[Explanation of the Principle]

The present invention applies, according to the voltage-second balance principle, the characteristic of the ripple current variation of the inductor in the transformer 210 equal to zero during each cycle in the continuous conduction mode so as to obtain the correct end time of each cycle. Referring to the circuit shown in FIG. 1, assume that the on-time is Ton, the cycle time is Ts and the cut-off time is Toff, then the duty cycle D of the first switch transistor 220 is defined as:

$$D \equiv \frac{T_{on}}{T_s} \quad \text{(Eq. 1)}$$

$$D = T_{on}/T_s \quad \text{(Eq.1)}$$

The inductive current IL flowing through the transformer 210 is shown in FIG. 7. It can be seen that the inductive current IL is composed of two parts, the rising slope m1 (in the interval between 0~dTs) and the descending slope m2 (in the interval between dTs~Ts), in one single cycle time. Based on the voltage and current change relationship of an inductor and the voltage-second balance principle, it is known that the relationship between the duty cycle D, the rising slope m1 and the descending slop m2 is as below:

$$D = \frac{-m_2}{m_1 - m_2} \quad \text{(Eq. 2)}$$

Assume that the voltage applied to boost the current amount is the first reference potential Vref1 and the voltage acting on the mean value of the current is the second reference potential Vref2, then the ratio of the first reference potential Vref1 to the second reference potential Vref2 is (m1−m2):(−m2), substituted into Eq. 2 to obtain:

$$\Rightarrow m_1 \cdot T_{on} + m_2 \cdot T_{off} = 0$$

$$\Rightarrow (V_{ref1} - V_{ref2}) \cdot T_{on} + (-V_{ref2}) \cdot T_{off} = 0$$

$$\Rightarrow (V_{ref1} - V_{ref2}) \cdot T_{on} = V_{ref2} \cdot T_{off} \quad \text{(Eq.3)}$$

Since the second reference potential Vref2 is equal to the product of the first reference potential Vref1 and the duty cycle D, it is understood better in this way that the second reference potential Vref2 is equal to the mean value of the product of the voltage of the first reference potential Vref1 and the duty cycle D.

With reference to FIGS. 8 and 9, it is known from the definition of a capacitor that:

$$Q = C \cdot V$$

$$= I \cdot t$$

$$\Rightarrow t = C \cdot V/I \quad \text{(Eq.4)}$$

Assume that the current applied to increase the integrating voltage Vc is the first reference current Iref1 and the current acting on decreasing the integrating voltage Vc is the second reference current Iref2. The on-time Ton and the cut-off time Toff are then substituted into Eq. 4 to obtain $T_{on}=$ $$T_{on} = \frac{C \cdot \Delta v_{(+)}}{(I_{ref1} - I_{ref2})}$$

and $$T_{off} = \frac{C \cdot \Delta v_{(-)}}{I_{ref2}}.$$

Further, according to the voltage-second balance principle, it is known that the voltage variation is zero, namely $\Delta v_{(+)} = \Delta v_{(-)}$. Let the ratios of the first reference current Iref1 and the second reference current Iref2 to the first reference potential Vref1 and the second reference potential Vref2 are K1 and K2 respectively. By simplifying the calculation to make K1=K2, it is substituted into Eq. 4 to obtain:

$$\frac{T_{on} \cdot (K_1 \cdot V_{ref1} - K_2 \cdot V_{ref2})}{C} = \frac{T_{off} \cdot (K_2 \cdot V_{ref2})}{C} \Rightarrow (V_{ref1} - V_{ref2}) \cdot T_{on} = V_{ref2} \cdot T_{off}$$

(Eq. 5)

It can be seen that Eq. 3 and Eq. 5 are identical, which implies that the above-identified real circuit comprising the inductors to detect the on-time Ton and the cut-off time Toff can be replaced by a capacitor circuit. Due to the current ripples flowing through the timing capacitor 33, the integrating voltage VC is generated at the two ends of the timing capacitor 33. As a result, through the voltage difference between the two ends of the timing capacitor 33, the correct time points of switching the second switch transistor 230 on or off can be obtained, thereby achieving the purpose of the synchronous rectification.

[Explanation of Control Method Flow]

The control method according to the present invention will be described in detail below. As shown in FIG. 10, the synchronous rectification control method comprises the steps as follows:

Step (a): Set up the time at which the first switch transistor 220 is turned on as the on-time Ton and the cut-off time is Toff. In this step, the on-time Ton and the cut-off time Toff can be determined and adjusted according to the user's requirements.

Step (b): Generate a conduction signal V11 which is configured to output a first reference potential Vref1 within the on-time Ton and a ground potential within the cut-off time Toff, and generate a second reference potential Vref2 equal to the mean value of the conduction signal V11.

Step(c): Convert the first reference potential Vref1 to a first reference current Iref1, and convert the second reference potential Vref2 to a second reference current Iref2. In one preferred embodiment to the present invention, it applies voltage-current convertor circuits for this step, and makes the voltage to current ratio of the first reference Iref1 is identical to that of the Iref2.

Step (d): Provide a timing capacitor 33, in which a timing current flows through, thus generating an integrating voltage VC.

Step (e): Within the on-time, set up the timing current configured to be the first reference current Iref1 subtracting the second reference current Iref2, and, within the cut-off time, set up the timing current configured to be the negative value of the second reference current Iref2. Thereby, when the first switch transistor 220 is turned on, the timing current gradually increases. On the other hand, when the first switch transistor 220 is turned off and the second switch transistor 230 is turned on instead, the timing current gradually decreases. Accordingly, the voltage of the timing capacitor 33 makes a response to increase or decrease.

Step (f): Determine whether or not the integrating voltage VC changes from a high potential to zero and perform the sub-steps as follows:

Sub-step (f1) If the integrating voltage VC is from a high potential to zero, then turn off the second switch transistor 230; and perform:

Sub-step (f2) Clear out the voltage of the timing capacitor 33. Note that step (f) is a loop step, which means if the integrating voltage VC does not reach to zero from a high potential, then the judgement of step (f) is continuously performed.

What is claimed is:

1. A synchronous rectifier control circuit, used to control a switching power supply which includes a transformer, a first switch transistor coupled to the primary side of the transformer and a second switch transistor coupled between the secondary side of the transformer and a load, comprising:

a conducting detection module comprising a first reference potential and a conducting detection comparator, wherein the conducting detection comparator outputs a conduction signal configured as the first reference potential or the ground potential according to whether the potential difference between the drain and the source of the second switch transistor is at a high potential;

a voltage averaging module comprising an averaged circuit coupled to the conduction signal and a second reference potential outputted from the averaged circuit;

a voltage-second balance module comprising a first reference current corresponding to the first reference potential, a second reference current corresponding to the second reference potential, a voltage-second balance switch connected between the first reference current and the second reference current and controlled by the conduction signal to turn on or off, a voltage-second balance comparator and a timing capacitor; wherein the voltage-second comparator is comprised of a positive input terminal at a low potential, a negative input terminal coupled to the end of the voltage-second balance switch in connection with the second reference current, and a reset signal coupled to the output of the voltage-second balance comparator, and the timing capacitor is connected between the positive input terminal and the negative input terminal; and a logic-controlled module comprising a logic circuit connected to the conduction signal and the reset signal, wherein the output of the logic circuit is connected to the gate of the second switch transistor to control the second switch transistor to turn on or off.

2. The control circuit of claim 1, wherein the conducting detection module is further comprised of a first threshold potential so that the conduction signal is configured as the first reference potential or the ground potential according to whether the potential difference between the drain and the source of the second switch transistor is higher than the first threshold potential.

3. The control circuit of claim 1, wherein the voltage-second balance module is further comprised of a second threshold potential coupled to the positive input terminal so that the reset signal is configured as pulse waves or the ground potential according to whether the potential of the negative input terminal is lower than the second threshold potential.

4. The control circuit of claim 1, wherein the averaged circuit comprises at least an averaged resistor coupled to the conduction signal, and at least an averaged capacitor connected between the averaged resistor and the ground potential.

5. The control circuit of claim 1, wherein the voltage-second balance module further comprises a pulse generator coupled to the conduction signal and a reset switch connected in parallel to the timing capacitor; and the pulse generator generates pulse waves when the conduction signal changes from a low potential to a high potential to turn on the reset switch.

6. A synchronous rectification control method, for controlling a switching power supply which includes a transformer, a first switch transistor coupled the primary side of the transformer and switched between on and off intermittently, and a second switch transistor coupled between the secondary side of the transformer and a load, comprising the steps of:

(a) setting up the time at which the first switch transistor is turned on as an on-time and the time at which the first switch transistor is turned off as a cut-off time;

(b) generating a conduction signal which is configured to output a first reference potential within the on-time and to output a ground potential within the cut-off time; and generating a second reference potential equal to the mean value of the conduction signal;

(c) converting the first reference potential to a first reference current, and converting the second reference potential to a second reference current;

(d) providing a timing capacitor in which a timing current flows through, thus generating an integrating voltage;

(e) setting, within the on-time, the timing current configured to be the first reference current subtracting the second reference current, and setting, within the cut-off time, the timing current configured to be the negative value of the second reference current; and (f) determining whether the integrating voltage changes from a high potential to zero and perform the sub-step (f1): turning off the second switch transistor if the integrating voltage is from a high potential to zero.

7. The control method of claim 6, wherein the step (f) is further comprised of a sub-step (f2): clearing out the voltage of the timing capacitor.

* * * * *